United States Patent [19]
Joe et al.

[11] Patent Number: 6,061,333
[45] Date of Patent: May 9, 2000

[54] ARRANGEMENT FOR CONFIGURING A VIDEO COMMUNICATION SYSTEM AND METHOD THEREFOR

[75] Inventors: Truman Joe, San Jose; Paul Augustin Voois, Sunnyvale, both of Calif.

[73] Assignee: 8x8, Inc., Santa Clara, Calif.

[21] Appl. No.: 08/890,000

[22] Filed: Jul. 10, 1997

[51] Int. Cl.$^7$ .................................................. H04Q 11/00
[52] U.S. Cl. .......................... 370/254; 370/360; 370/465; 340/825.02; 348/7
[58] Field of Search .................................... 370/254, 255, 370/256, 389, 390, 400, 401, 402, 408, 351, 465, 360; 340/825.02; 348/7, 10

[56] References Cited

U.S. PATENT DOCUMENTS

| | | | |
|---|---|---|---|
| 5,414,704 | 5/1995 | Spinney | 370/389 |
| 5,598,532 | 1/1997 | Liron | 370/254 |
| 5,802,054 | 9/1998 | Bellenger | 370/401 |
| 5,831,975 | 11/1998 | Chen et al. | 370/408 |

OTHER PUBLICATIONS

ITU–T Telecommunication Standarization Sector of ITU "Line Transmission of Non–Telephone Signals/Terminal for Low Bitrate Multimedia Communication"—Draft ITU–T Recommendation H.324, *International Telecommunication Union*, pp. 1–33 (Nov. 22, 1995).

ITU–T Telecommunication Standardization Sector of ITU "Study Group 15–Contribution/Line Transmission of Non–Telephone Signals/Control Protocol for Multimedia Communication"—ITU Recommendation H.245, *International Telecommunication Union*, pp. 1–223 (Jun. 4, 1996).

*Primary Examiner*—Douglas W. Olms
*Assistant Examiner*—Shick Hom

[57] ABSTRACT

Configuring a communication arrangement that transmits video and other signal types using operational modes includes constructing a hierarchy of nodes representing the operational modes. The hierarchy also includes null nodes and a root node. Scores are collected as the nodes are traversed. The score represents a difference between the operational modes represented by the nodes along the path and desired operational modes received from a data recovery terminal. When the sum of scores collected for a set of nodes exceeds a threshold, the order of traversal is reversed. Reversing the order discards inefficient solutions and avoids dedication of system resources to evaluating such solutions. In addition, decreasing the number of paths evaluated permits more rapid determination of the operational modes best matching the desired operational modes.

22 Claims, 7 Drawing Sheets

ARRANGEMENT FOR CONFIGURING A VIDEO COMMUNICATION SYSTEM AND METHOD THEREFOR

FIELD OF THE INVENTION

The present invention relates to communication systems. More particularly, the present invention relates to configuring video communication systems.

BACKGROUND OF THE INVENTION

The widespread use of digital processing technology has found its way into a variety of equipment and, in some form, into most industries. In many applications involving communicating different types of information, communication systems have been configured to transmit information from each type of information source over various communications media.

In some multimedia application environments, for example, communication systems permit several data sources to transmit data over a communication channel. In such an environment, a communication system typically processes certain types of data from each of the several data sources and presents this processed data to communication channel transmission equipment, such as a modem, in an orderly fashion.

The communication system formats the processed data for transmission using operational modes known as capabilities. Each type of data may be formatted using any of a variety of capabilities. For example, video data may be transmitted using capabilities supporting the H.261 and H.263 standards specified by the Telecommunication Standardization Sector of the International Telecommunication Union (ITU-T). When a connection is first established between communication systems operating in such an environment, each system typically broadcasts to the other its valid operating modes in order to establish a set of capabilities for use during the session. The systems then select a set of capabilities that are ideally compatible with each system.

Selecting the capabilities is complicated by certain constraints on simultaneous use of capabilities. Due to system limitations, such as memory constraints, not all capabilities can be simultaneously operated. Rather, many communication systems can use the capabilities only in certain combinations. When establishing the connection, each system typically transmits its constraints to the other, which takes these constraints into consideration in selecting the capabilities for use during the session.

In addition, many communication systems lack uniformity in the capabilities they support. As a result, it is often difficult, if not impossible, to select capabilities that the communication systems involved in the session support.

SUMMARY OF THE INVENTION

According to one embodiment, the present invention is directed to a method for configuring a communication system transmitting video and other signal types using operational modes. The method includes constructing a first hierarchy having first nodes representing the operational modes, second nodes, and a root node operatively connected to the first and second nodes. Scores are collected by traversing at least one of the first and second nodes. The scores are associated with the traversed nodes. If a sum of collected scores exceeds a threshold, a previously traversed node is returned to. The operational modes represented by the traversed nodes corresponding to a minimum sum of collected scores are selected. This method may be implemented by a communication system.

Another embodiment of the present invention is directed to a multimedia communication arrangement for use in transmitting video and other signal types to a data recovery terminal. The multimedia communication system includes data sources, configured and arranged to generate data signals. At least one of the data sources includes a video image processor configured and arranged to capture images and to present the images as a video signal. A modem is responsive to the data signals and is configured and arranged to transmit the data signals to the data recovery terminal using selected operational modes. The modem is also configured and arranged to receive a set of desired operational modes from the data recovery terminal.

A data processor is configured and arranged to construct a hierarchy having first nodes representing the operational modes, second nodes. A root node is operatively connected to the first and second nodes. The data processor collects scores by traversing at least one of the first and second nodes, the scores being associated with the traversed nodes. If a sum of collected scores exceeds a threshold, the data processor returns to a previously traversed node. The data processor selects the operational modes represented by the traversed nodes corresponding to a minimum sum of collected scores.

The above summary of the invention is not intended to describe each disclosed embodiment of the present invention. This is the purpose of the figures and of the detailed description that follows.

BRIEF DESCRIPTION OF THE DRAWINGS

Other aspects and advantages of the present invention will become apparent upon reading the following detailed description and upon reference to the drawings in which.

Figure 1:
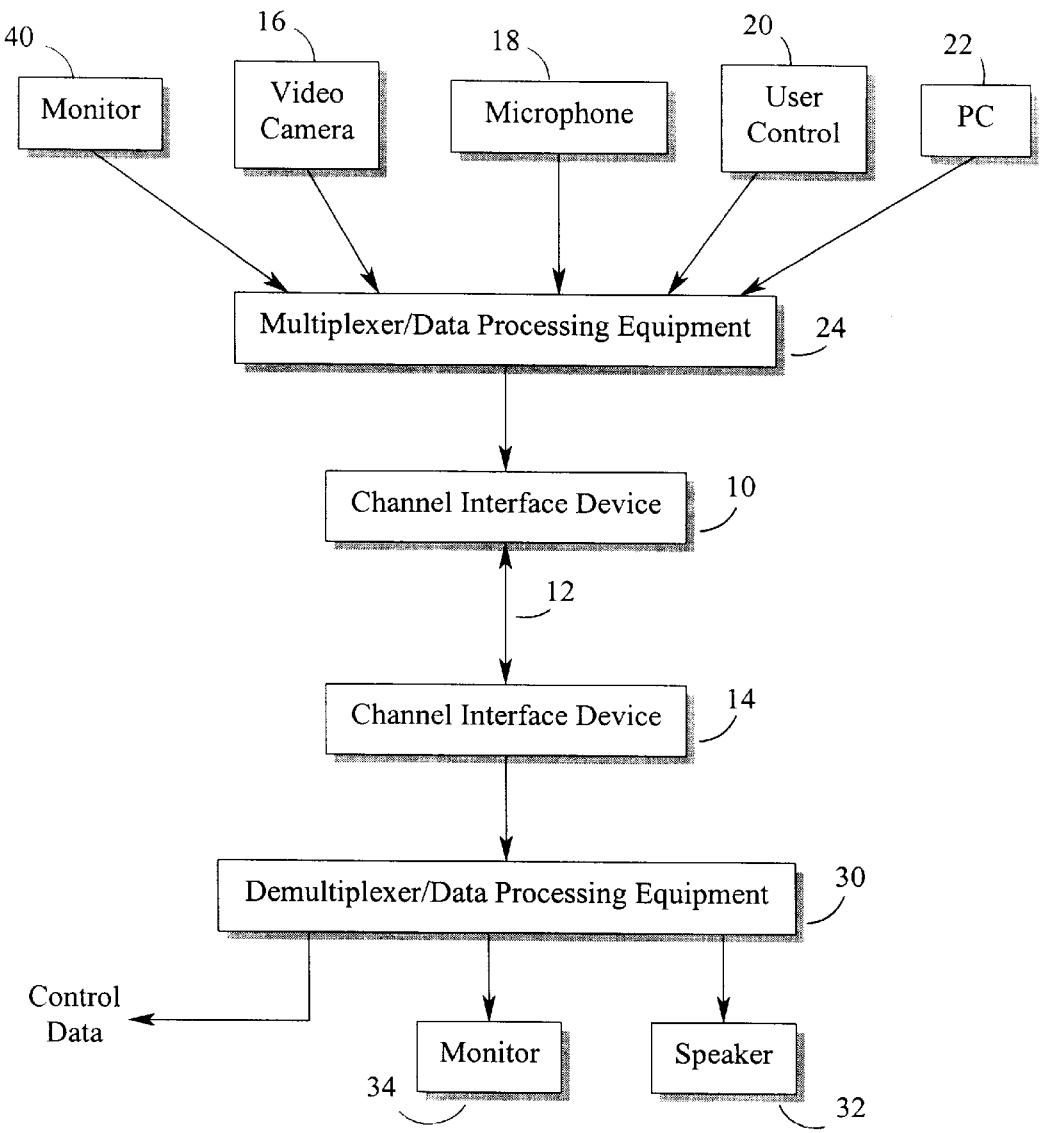
FIG. 1 is a block diagram of a videoconferencing system, according to a particular application of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of systems and arrangements that process more than one input data source for transmission using a common transmission channel. The invention has been found to be particularly advantageous in application environments in which the input data sources generate different types of data, e.g., video data and audio data. An appreciation of various aspects of the invention is best gained through a discussion of various application examples operating in such an environment.

Turning now to the drawings, FIG. 1 illustrates a data processing system for a video conferencing application. The system includes data sending equipment depicted above a communication channel 12 of FIG. 1 and data receiving equipment depicted below the communication channel 12. While the sending and receiving of such data is often reciprocal in many data processing applications of this type as with the instant video conferencing illustration, the configuration illustrated in FIG. 1 is simplified in this regard to facilitate the discussion.

At the sending end of the system of FIG. 1, a transmitting channel interface device 10 is used to send processed data over the communication channel 12 to a receiving channel interface device 14. The data that is presented to the channel interface device 10 is collected from various types of data sources including, for example, a video camera 16, a microphone 18, a user control device 20, and a conventional personal computer 22. The data sources typically use buffers to store the data to be collected. The data collected from each of these data sources is received by multiplexer/data processing equipment (MDPE) 24. The MDPE 24 collects and formats the data collected from each of the input sources for transmission over the channel 12. A monitor 40 is optionally used with the video camera 16 to monitor the manner in which the video camera 16 captures the video images.

At the lower end of the system of FIG. 1, the formatted data communicated over the channel 12 is received by the channel interface device 14, which then presents the received data to demultiplexer/data processing equipment (DDPE) 30. The DDPE 30 is set up to sort out the formatted data received over the channel 12 according to instructions previously sent by the MDPE 24. The demultiplexed data is then presented to the appropriate output source equipment, including audio data to a speaker 32, video data to a monitor 34, and control data to external equipment for subsequent processing.

Figure 3:
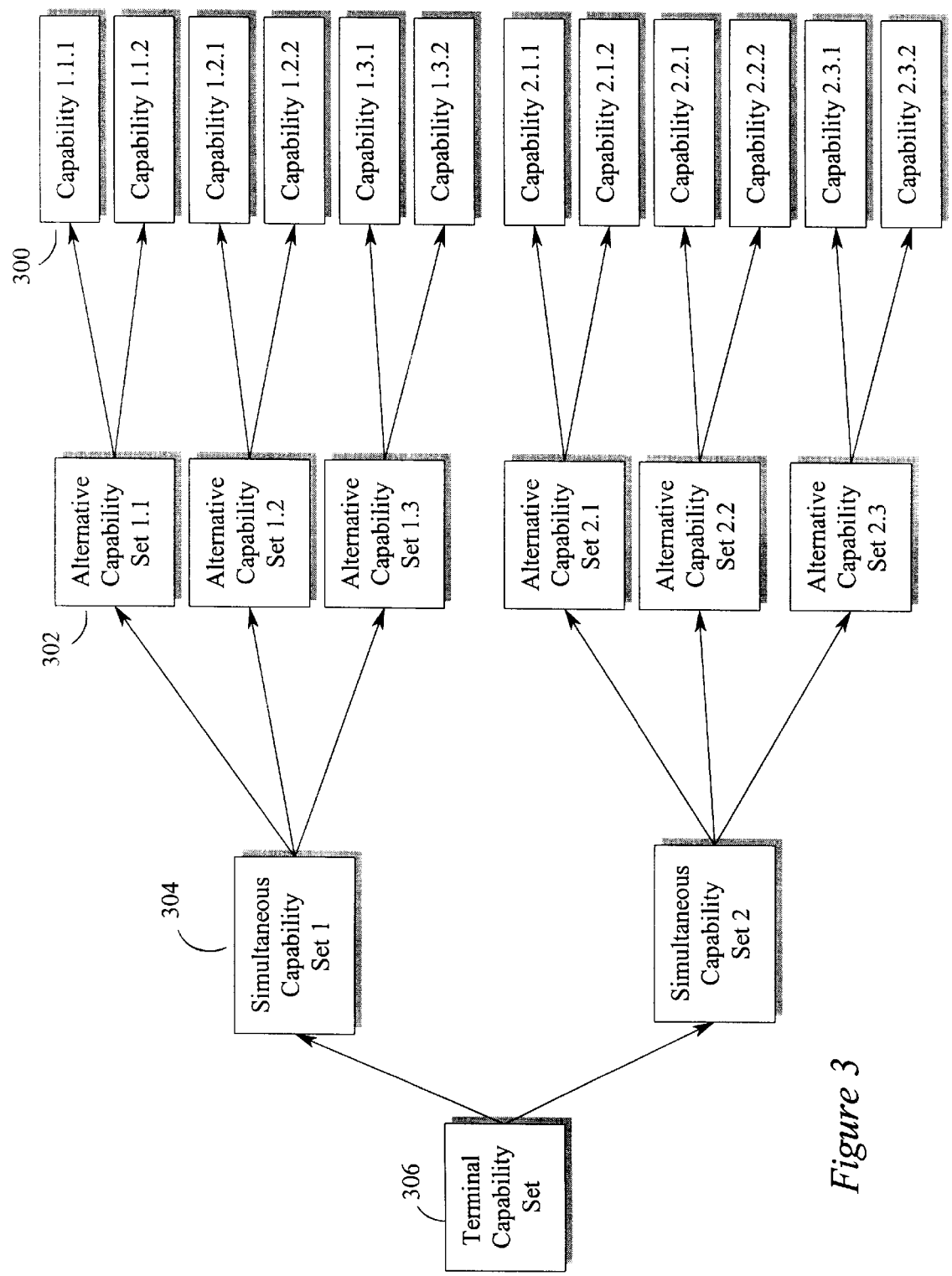
FIG. 3 is a diagram conceptually illustrating modes of operation organized in an example structure, according to the present invention.

The MDPE 24 formats the collected data for transmission using any of a variety of modes of operation or capabilities. For example, audio data may be formatted using a capability that supports the ITU-T G.711, G.723, or G.728 standard. FIG. 3 illustrates a number of capabilities 300. For purposes of discussion, the capabilities 300 are labeled "capability 1.1.1," "capability 1.1.2," and so forth.

The capabilities 300 are grouped in sets known as alternative capability sets 302. While each alternative capability set 302 is illustrated as containing two capabilities 300, it should be understood that the alternative capability sets 302 may contain different numbers of capabilities 300. Each alternative capability set 302 contains capabilities 300 selected such that, during a given transmission, the communication system can operate only one capability 300 from each alternative capability set 302. Accordingly, the choice of particular capabilities 300 contained in an alternative capability set 302 is influenced by certain system constraints, such as memory limitations. In many application environments, it is desirable to provide at least one alternative capability set 302 for each type of signal (e.g., video, audio) that contains only capabilities 300 for formatting the respective type of signal. For example, one such alternative capability set 302 consists only of capabilities 300 that support the ITU-T G.711, G.723, and G.728 standards. Providing such an alternative capability set 302 for each type of signal ensures that a capability 300 will be selected for each type of signal.

The alternative capability sets 302 are in turn organized in simultaneous capability sets 304. The simultaneous capability sets 304 represent the combinations of capabilities 300 that can be operated simultaneously. For example, capabilities 1.1.2 and 1.3.1 can be operated simultaneously. Capabilities 1.1.2 and 2.1.2, however, cannot be operated simultaneously due to any of a variety of system constraints. Accordingly, capabilities 1.1.2 and 2.1.2 are respectively assigned to simultaneous capability sets 1 and 2. The simultaneous capability sets 304 are organized in a terminal capability set 306, which represents all of the capabilities 300 supported by a communication system.

Figure 2A:
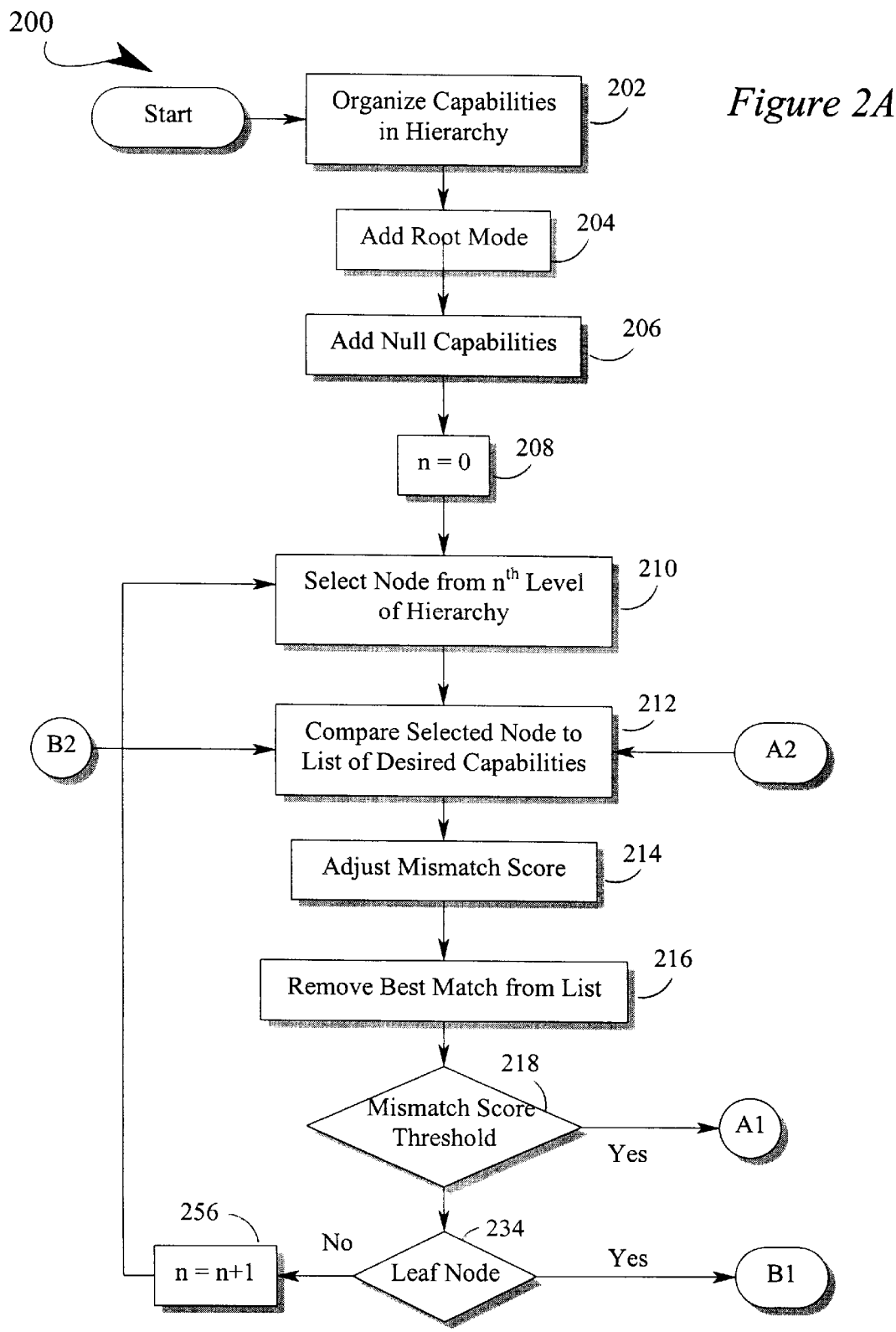
FIGS. 2A–2C comprise a flowchart illustrating an example system configuration method, according to another particular application of the present invention.
Figure 2B:
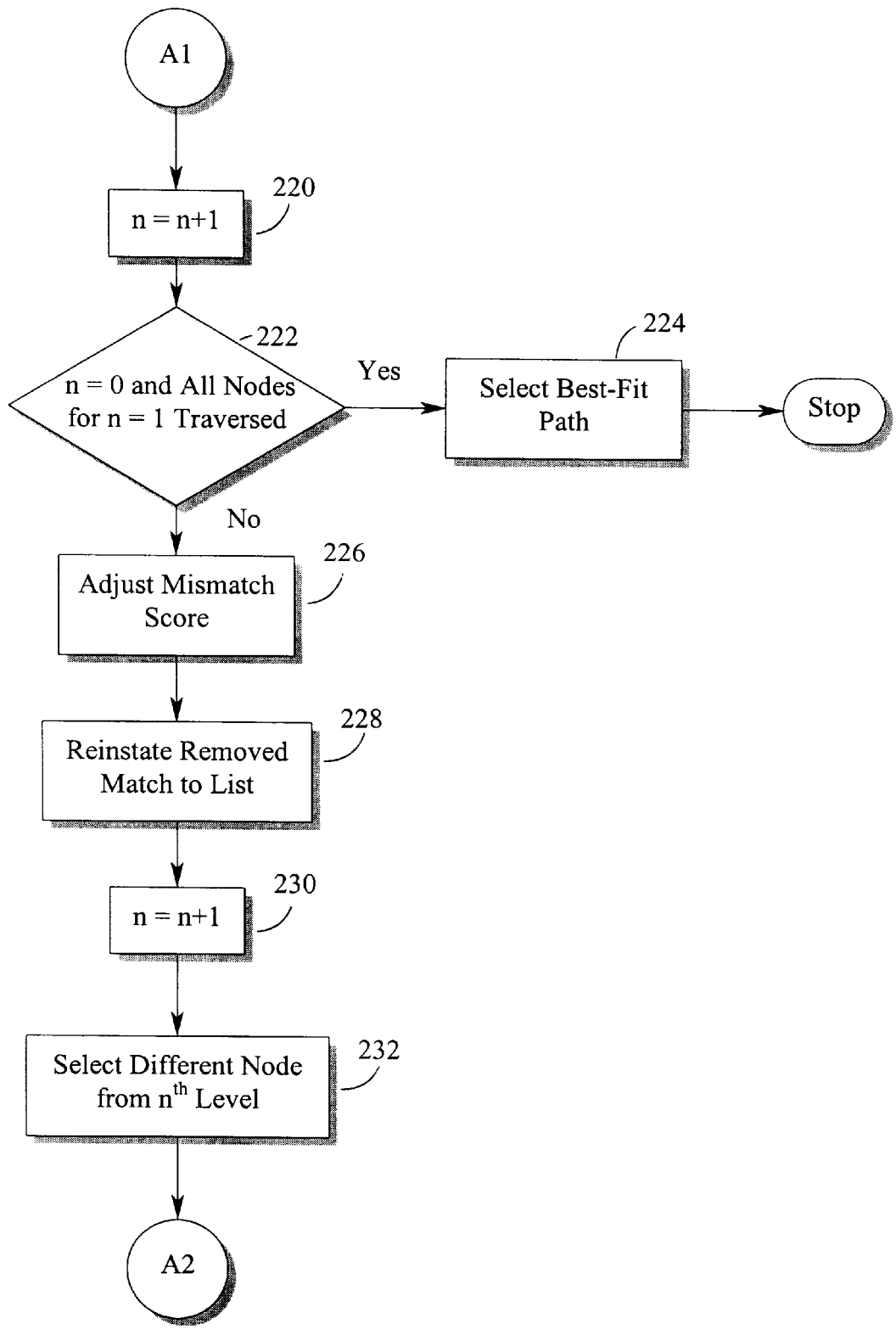
Figure 2C:
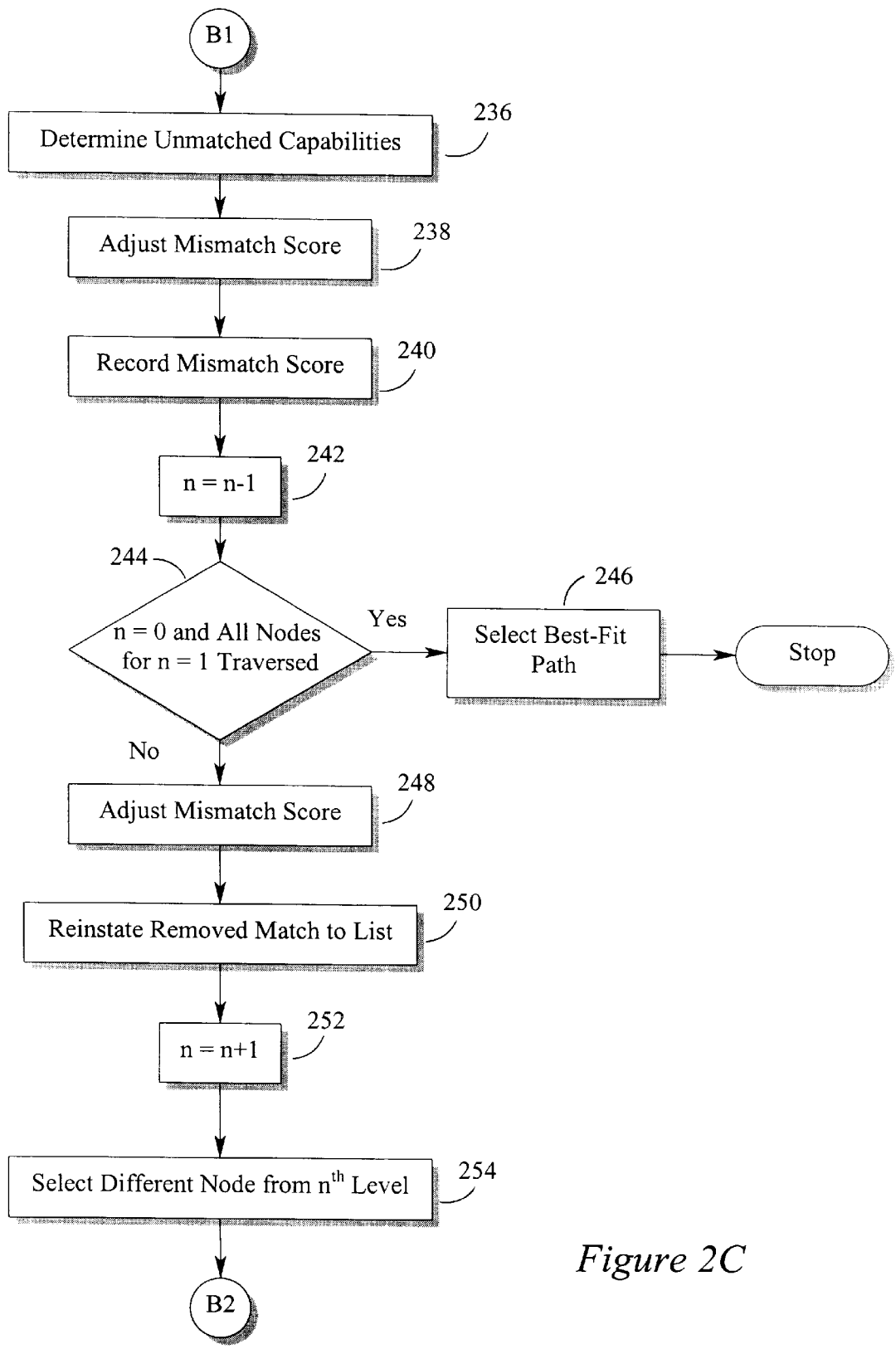
Figure 4:
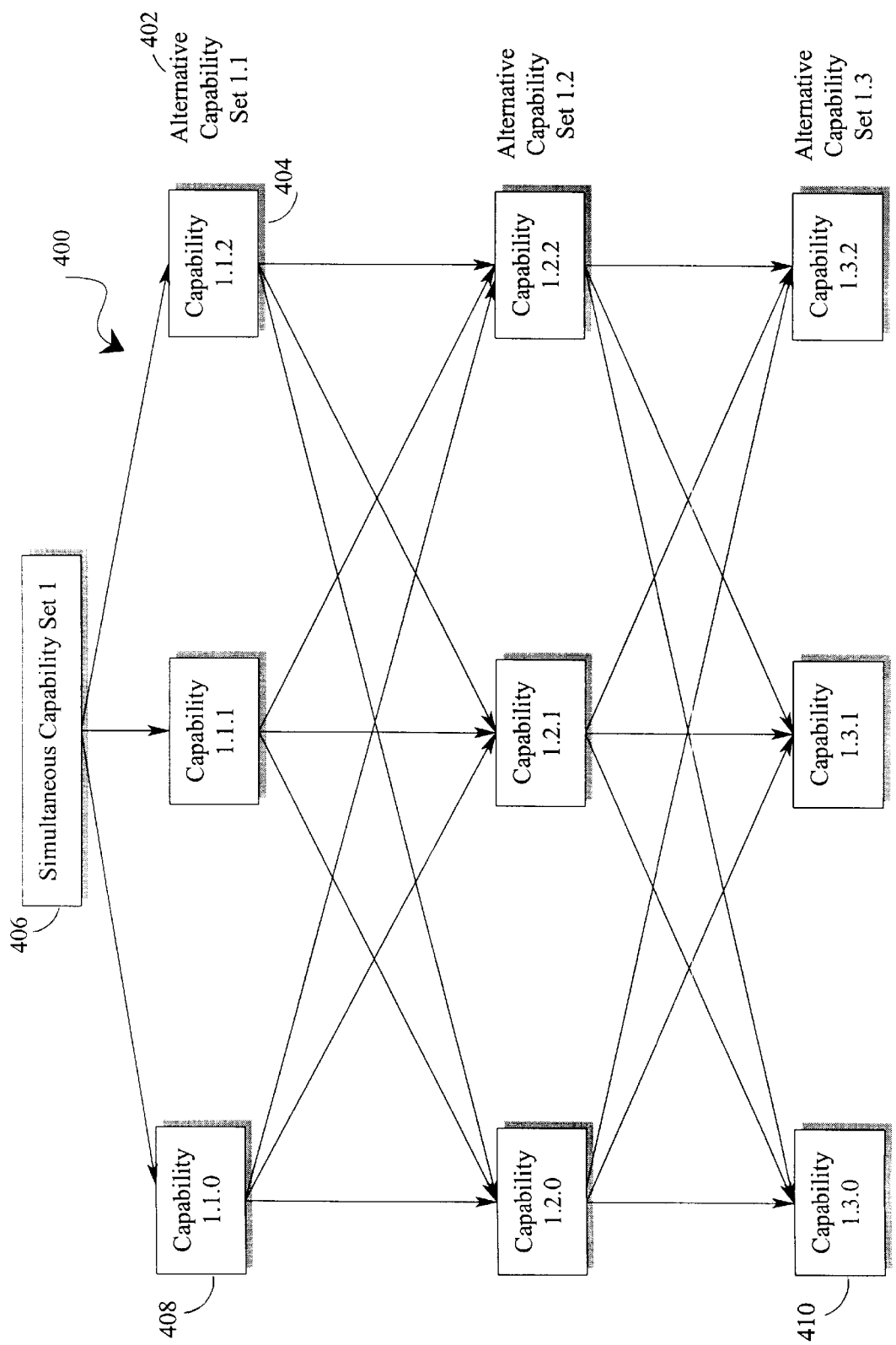
FIG. 4 is a diagram conceptually illustrating an example hierarchy constructed using the modes of operation of FIG. 3, according to the present invention.

FIGS. 2A–2C comprise a flowchart illustrating an example method of operation 200 of the system of FIG. 1. At a block 202, the capabilities are organized in a hierarchy. An example hierarchy 400 is illustrated in FIG. 4. The alternative capability sets are represented as levels 402 of the hierarchy. Each level 402 contains a number of nodes 404, which represent the capabilities in an alternative capability set. The lowest level 402, representing alternative capability set 1.3 in the example hierarchy of FIG. 4, consists of leaf nodes 410 that represent the capabilities in alternative capability set 1.3.

As depicted at a block 204 of FIG. 2, the MDPE adds a root node 406 to the top of the hierarchy 400 of FIG. 4. The root node 406 represents the simultaneous capability set containing the alternative capability sets represented by the levels 402 of the hierarchy 400. The MDPE also adds a null node 408 to each level 402, as depicted at a block 206. These null nodes 408 do not represent capabilities that are used by the system. Rather, the system creates the null nodes 408 to improve the accuracy of the system configuration process by ensuring that the MDPE evaluates capabilities in all alternative capability sets.

After constructing the hierarchy, the MDPE performs a depth-first search of the hierarchy to find the capabilities that best match the desired capabilities. The MDPE maintains a running score representing the degree of mismatch between a set of evaluated capabilities and the desired capabilities. The MDPE then selects the evaluated capabilities having the minimum mismatch score.

In particular, at a block 208, the MDPE sets an index variable n to an initial value of one. The index variable n represents the current search level. For example, when n is zero, the search is at the root node 406. Similarly, when n is one, the search is at the level immediately under the root node 406.

Next, as depicted at a block 210, the MDPE selects a node from the nth level of the hierarchy. The MDPE initially selects a node from the first level. At a block 212, the MDPE compares the capability represented by the selected node to a set of desired capabilities received from a remote system, such as a data recovery terminal. The set of desired capabilities consists of, for example, the capabilities that are supported by the remote system.

Specifically, the MDPE determines which desired capability in the list best matches the capability represented by the selected node, as well as the degree of mismatch between these capabilities. The MDPE then adjusts a collected mismatch score according to the degree of mismatch, as depicted at a block 214. This mismatch score represents the cumulative difference between the desired capabilities and the capabilities represented by the nodes traversed along a path. Accordingly, a low mismatch score indicates a close match, which a high mismatch score indicates a poor match.

If the selected capability differs only slightly from the capability represented by the node, the MDPE adds a relatively small increment to the mismatch score. On the other hand, if the selected capability differs greatly from the capability represented by the node, e.g., the capabilities are used for formatting different types of signals, the MDPE adds a relatively large increment to the mismatch score. After adjusting the mismatch score, the MDPE removes the best-fit capability from the list of desired capabilities, as depicted at a block 216. By removing this capability from the list, the MDPE avoids attempting to match the same desired capability more than once.

If the node is a null node 408, the MDPE does not select a capability from the set of desired capabilities because the null node 408 does not represent a capability used by the system. Accordingly, the MDPE does not adjust the mismatch score or remove any capability from the list. The MDPE can thus evaluate capabilities represented by nodes in lower levels of the hierarchy in matching the desired capabilities. This improves the accuracy of the system configuration process by ensuring that the MDPE evaluates capabilities from all of the alternative capability sets.

Next, the MDPE determines whether the collected mismatch score for the traversed nodes exceeds a threshold value, as depicted at a decision block 218. This threshold value is determined, e.g., as a function of previously collected mismatch scores. If the mismatch score exceeds the threshold value, flow proceeds to a block 220 of FIG. 2B, at which the MDPE decrements the index variable n. The search thus moves up a level toward the root node. Accordingly, the MDPE reverses the order of traversal when it is known that a path will not yield a best-fit solution. This improves the efficiency of the search by reducing the number of paths to be evaluated. At a decision block 222, the MDPE determines whether the search is completed, e.g., whether n=0 and all nodes in the first level have been traversed. If so, the MDPE selects the set of capabilities corresponding to the path having a minimum mismatch score, as depicted at a block 224. Otherwise, flow proceeds to a block 226.

As the MDPE traverses a node in reverse order, it decreases the mismatch score by an amount equal to the amount by which it increased the mismatch score when it traversed the node in the original order. This process is depicted at the block 226. In addition, as depicted at a block 228, the capability that was removed from the list is reinstated. At a block 230, the MDPE increments the index variable n and moves back to the lower level in the hierarchy. The MDPE then selects a different node from that level, as depicted at a block 232, and flow returns to the block 212 of FIG. 2A, where the MDPE compares the new selected node to the list of desired capabilities.

If, in connection with the block 218, the MDPE determines that the mismatch score does not exceed the threshold value, flow proceeds to a decision block 234. The MDPE then determines whether the node is a leaf node. If not, the MDPE increments the index variable n and moves down a level in the hierarchy, as depicted at a block 256. Flow then returns to the block 210, at which the MDPE selects and evaluates a node from the lower level in the hierarchy.

If the node is a leaf node, the MDPE determines the unmatched desired capabilities, as depicted at a block 236 of FIG. 2C. These unmatched capabilities are those capabilities that remain in the list. At a block 238, the MDPE adjusts the mismatch score by adding a relatively large mismatch value for each unmatched capability. The adjusted mismatch score is recorded at a block 240. At a block 242, the MDPE decrements the index variable n and moves up a level in the hierarchy. At a decision block 244, the MDPE determines whether the search is completed, e.g., whether n=0 and all nodes in the first level have been traversed. If so, the MDPE selects the set of capabilities corresponding to the path having a minimum mismatch score, as depicted at a block 246.

As the MDPE traverses a node in reverse order, it decreases the mismatch score by an amount equal to the amount by which it increased the mismatch score when it traversed the node in the original order. This process is depicted at a block 248. In addition, as depicted at a block 250, the capability that was removed from the list is reinstated. At a block 252, the MDPE increments the index variable n and moves back to the lower level in the hierarchy. The MDPE then selects a different node from that level, as depicted at a block 254, and flow returns to the block 212 of FIG. 2A, where the MDPE compares the new selected node to the list of desired capabilities.

The technique described above can be adapted for application in a variety of environments. For example, in a system using a terminal capability set that includes multiple simultaneous capability sets, the MDPE optionally constructs a hierarchy for each simultaneous capability set. The MDPE then organizes the root nodes of these hierarchies as children nodes of a higher order hierarchy. The search proceeds as described above, but starts at the root node of the higher order hierarchy. With the higher order hierarchy constructed in this manner, the MDPE selects all capabilities for operation during a particular communication session from one simultaneous capability set.

Figure 5:
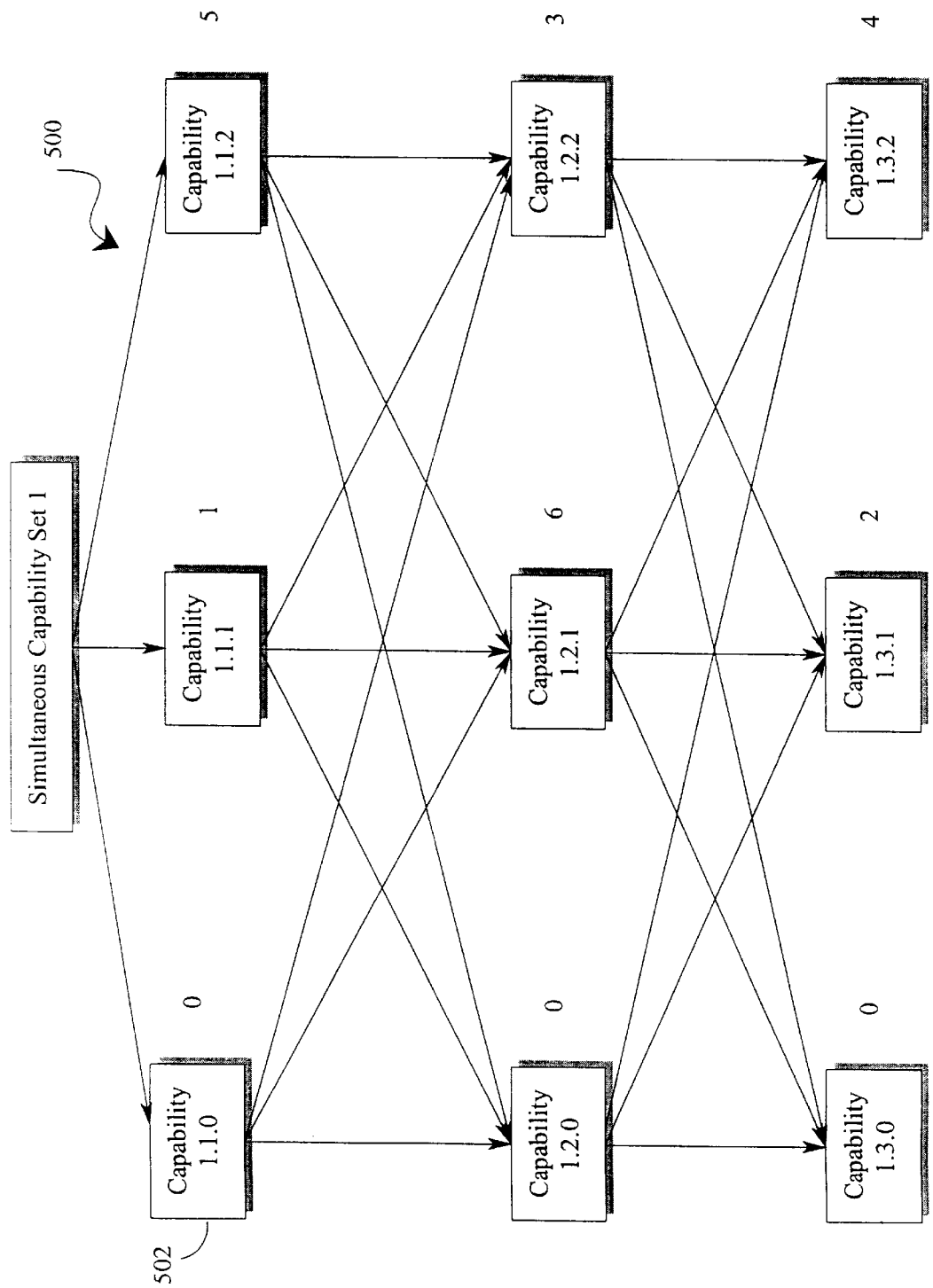
FIG. 5 is a diagram conceptually illustrating an example configuration performed using the method of FIGS. 2A–2C, according to a particular application of the present invention.

FIG. 5 illustrates a particular example implementation of the process described above in connection with FIGS. 2A–2C. After constructing a hierarchy 500 of nodes, the MDPE traverses the nodes to find the set of capabilities that best matches a set of desired capabilities received from a remote terminal. These desired capabilities can include, for example, a capability compatible with the H.263 video standard and a capability compatible with the G.723 audio standard.

Initially, the MDPE traverses null nodes 502. As indicated by the zeros to the right of the null nodes 502, the MDPE collects scores of zero when it traverses the null nodes 502. Because the MDPE does not select capabilities when it traverses the null nodes 502, the MDPE does not remove any capabilities from the list of desired capabilities to be matched. As a result, all of the desired capabilities remain unmatched. The MDPE thus adds a large mismatch value after it traverses the null node 502 labeled, "capability 1.3.0."

After traversing this null node 502, the MDPE returns to the null node 502 labeled "capability 1.2.0." It then traverses the node representing capability 1.3.1, which is, for example, a capability that closely matches the H.263-compliant desired capability. The MDPE determines the degree of mismatch between capability 1.3.1 and the H.263-compliant desired capability and collects a score, e.g., 2. After collecting the score, the MDPE removes the H.263-compliant desired capability from the list of desired capabilities to be matched. Because the node representing capability 1.3.1 is a leaf node, the MDPE adds a mismatch score for each unmatched desired capability, i.e., the desired capabilities remaining in the list. This total mismatch score is less than the total score for the path consisting entirely of the null nodes 502 because the H.263-compliant capability is no longer in the list.

After traversing the node representing capability 1.3.1, the MDPE reinstates the H.263-compliant capability to the list and subtracts the mismatch score associated with the node and the mismatch scores collected for the unmatched desired capabilities from the running total. The MDPE then returns to the null node 502 labeled, "capability 1.2.0" and traverses the node representing capability 1.3.2. The MDPE evaluates this node as discussed in connection with the node representing capability 1.3.1.

To improve the efficiency of the search, the MDPE may be arranged to immediately reverse the order of traversal when the running total of mismatch scores exceeds a threshold. This threshold may be defined, for example, as the lowest total score collected in traversing previous paths. For example, as indicated by the numbers to the right of the nodes 500, the MDPE collects a total score of 1 +3+2=6 when it traverses the path connecting the nodes representing capabilities 1.1.1, 1.2.2, and 1.3.1. When the MDPE traverses the path connecting the nodes representing capabilities 1.1.1, 1.2.2., and 1.3.1, it collects a total score of 8. In this example, the threshold is defined as 6, since it is the lower total score.

When the MDPE traverses the nodes representing capabilities 1.1.2 and 1.2.1, the running total is 5+6=11. Because this running total is greater than the threshold of 6, no path containing these nodes will yield the best-fit solution. Accordingly, rather than traversing the leaf nodes, the MDPE immediately returns to the node representing capability 1.1.2. The MDPE thus reduces the number of evaluated paths and conserves computing resources. Similarly, after traversing the nodes representing capabilities 1.1.2 and 1.2.2, the MDPE immediately returns to the node representing capability 1.1.2.

Next, because no nodes immediately below the root node remain to be traversed, the MDPE selects the capabilities represented by the nodes along the path having the lowest total mismatch score. In this example, the MDPE selects capabilities 1.1.1, 1.2.2, and 1.3.1. It then transmits a list of these capabilities to the remote terminal to indicate that these capabilities should be used during the communication session.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims.

What is claimed is:

1. For use in a communication system transmitting video and other signal types using operational modes, a configuration method comprising:

constructing a first hierarchy having first nodes, second nodes, and a root node operatively connected to the first and second nodes, and operational modes including capabilities for transmitting at least one of the following signal types: video, audio and data:

collecting scores by traversing at least one of the first and second nodes, the scores being associated with the traversed nodes;

responding to a sum of collected scores exceeding a threshold by returning to a previously traversed node; and selecting the operational modes represented by the traversed nodes corresponding to a minimum sum of collected scores;

grouping the capabilities in alternate capability sets; and selecting at most one capability for use during a particular transmission from each of the alternate capability sets.

2. The configuration method, according to claim 1, further comprising assigning the levels of the first hierarchy to the alternate capability sets.

3. The configuration method, according to claim 1, further comprising:

grouping the alternate capability sets in simultaneous capability sets; and selecting the capabilities for use during another particular transmission from one of the simultaneous capability sets.

4. The configuration method, according to claim 3, wherein the root node represents one of the simultaneous capability sets.

5. The configuration method, according to claim 3, further comprising:

constructing a plurality of first hierarchies, a root node of each of the plurality of first hierarchies representing one of the simultaneous capability sets; and constructing a second hierarchy having a root node representing a set of the capabilities with which the communication system is compatible, the root nodes of the first hierarchies being child nodes of the root node of the second hierarchy.

6. For use in a communication system transmitting video and other signal types using operational modes, a configuration method comprising:

constructing a first hierarchy having first nodes representing the operational modes, second nodes, and a root node operatively connected to the first and second nodes;

collecting scores by traversing at least one of the first and second nodes, the scores being associated with the traversed nodes;

responding to a sum of collected scores exceeding a threshold by returning to a previously traversed node;

selecting the operational modes represented by the traversed nodes corresponding to a minimum sum of collected scores; and responding to traversing a node by removing a desired operational mode from a list of operational modes considered in collecting the scores.

7. The configuration method, according to claim 6, further comprising:

returning to a previously traversed node;

reinstating the removed desired operational mode into the list of operational modes; and subtracting an amount from the collected scores corresponding to a score associated with the previously traversed node.

8. The configuration method, according to claim 6, further comprising, after traversing a leaf node of the first hierarchy, adding to the collected scores an amount determined as a function of the operational modes remaining in the list of operational modes.

9. The configuration method, according to claim 6, further comprising responding to traversing one of the second nodes by omitting removing the desired operational mode from the list of operational modes.

10. For use in a communication system transmitting video and other signal types using operational modes, a configuration method comprising:

constructing a first hierarchy having first nodes representing the operational modes, second nodes, and a root node operatively connected to the first and second nodes;

collecting scores by traversing at least one of the first and second nodes, the scores being associated with the traversed nodes;

responding to a sum of collected scores exceeding a threshold by returning to a previously traversed node;

selecting the operational modes represented by the traversed nodes corresponding to a minimum sum of collected scores; and calculating the threshold using scores corresponding to previously traversed nodes.

11. For use in transmitting video and other signal types, a communication arrangement, comprising:

means for constructing a first hierarchy having first nodes, second nodes, and a root node operatively connected to the first and second nodes, at least the first nodes corresponding to operational nodes including capabilities for transmitting at least one of the following signal types: video, audio and data;

means for collecting scores by traversing at least one of the first and second nodes, the scores being associated with the traversed nodes;

means for responding to a sum of collected scores exceeding a threshold by returning to a previously traversed node;

means for selecting the operational modes presented by the traversed nodes corresponding to a minimum sum of collected scores;

means for grouping the capabilities in alternate capability sets; and means for selecting at most one capability for use during a particular transmission from each of the alternate capability sets.

12. For use in transmitting video and other signal types to a data recovery terminal, a multimedia communication arrangement, comprising:

a plurality of data sources configured and arranged to generate data signals, at least one of the plurality of data sources including a video image processor configured and arranged to generate a video signal;

a modem responsive to the data signals and configured and arranged to transmit the data signals to the data recovery terminal using selected operational modes including capabilities for transmitting at least one of the following signal types: video, audio, and data; and a data processor configured and arranged to construct a first hierarchy having first nodes, second nodes, and a root node operatively connected to the first and second nodes, collect scores by traversing at least one of the first and second nodes, the scores being associated with the traversed nodes, respond to a sum of collected scores exceeding a threshold by returning to a previously traversed node, select the operational modes represented by the traversed nodes corresponding to a minimum sum of collected scores, group the capabilities in alternate capability sets, and select at most one capability for use during a particular transmission from each of the alternate capability sets.

13. The multimedia communication arrangement, according to claim 12, wherein the data processor is further configured and arranged to assign levels of the first hierarchy to the alternate capability sets.

14. The multimedia communication arrangement, according to claim 12, wherein the data processor is further configured and arranged to:

group the alternate capability sets in simultaneous capability sets; and select the capabilities for use during the particular transmission from one of the simultaneous capability sets.

15. The multimedia communication arrangement, according to claim 14, wherein the root node represents one of the simultaneous capability sets.

16. The multimedia communication arrangement, according to claim 14, wherein the data processor is further configured and arranged to:

construct a plurality of first hierarchies, a root node of each of the plurality of first hierarchies, the root node of each of the plurality of first hierarchies representing one of the simultaneous capability sets; and construct a second hierarchy having a root node representing a set of the capabilities with which the communication arrangement is compatible, the root nodes of the first hierarchies being child nodes of the root node of the second hierarchy.

17. The multimedia communication arrangement, according to claim 12, wherein the data processor is further configured and arranged to respond to traversing a node by removing a desired operational mode from a list of operational modes considered in collecting the scores.

18. The multimedia communication arrangement, according to claim 17, wherein the data processor is further configured and arranged to:

return to a previously traversed node;

reinstate the removed desired operational mode into the list of operational modes; and subtract an amount from the collected scores corresponding to a score associated with the previously traversed node.

19. The multimedia communication arrangement, according to claim 17, wherein the data processor is further configured and arranged to, after traversing a leaf node of the first hierarchy, add to the collected scores an amount determined as a function of the desired operational modes remaining in the list of operational modes.

20. The multimedia communication arrangement, according to claim 17, wherein the data processor is further configured and arranged to respond to traversing one of the second nodes by omitting removing the desired operational mode from the list of operational modes.

21. The multimedia communication arrangement, according to claim 12, wherein the data processor is further configured and arranged to calculate the threshold using scores corresponding to previously traversed nodes.

22. For use in a communication system transmitting video and other signal types using operational modes comprising capabilities for at least one of video, audio and data signal types, a configuration method comprising:

a) constructing a hierarchy of operational modes in which capabilities are grouped into alternative capability sets;

b) searching the hierarchy for a set of operational modes that best matches a desired set of modes and that contains at most one capability from each of the alternative capability sets;

c) transmitting the video and other signal types using the best matching set of operational modes.

* * * * *

UNITED STATES PATENT AND TRADEMARK OFFICE
CERTIFICATE OF CORRECTION

PATENT NO. : 6,061,333  
DATED : May 9, 2000  
INVENTOR(S) : Joe et al.

It is certified that error appears in the above-identified patent and that said Letters Patent is hereby corrected as shown below:

Title page,  
The second inventor's middle name should read -- Augustine --.

OTHER PUBLICATION, "Standarization" should read -- Standardization --.

Figure 2A,  
In the box labeled 208, "n=0", should read -- n=1 --.

Figure 2B,  
In the box labeled 220, "n=n+1", should read -- n=n-1 --.

Column 2,  
Line 18, "nodes. A root node is", should read -- nodes, and a root node is --.

Column 5,  
Line 5, "which", should read -- while --.

Column 7,  
Line 23, "1.3.1", should read -- 1.3.2 --.

Column 10,  
Line 46, "omitting" should be deleted.

Signed and Sealed this

Eighth Day of January, 2002

*Attest:*

*Attesting Officer*

JAMES E. ROGAN  
*Director of the United States Patent and Trademark Office*